US012177009B1

(12) United States Patent
Gardner et al.

(10) Patent No.: US 12,177,009 B1
(45) Date of Patent: Dec. 24, 2024

(54) SYSTEM AND METHOD OF PROVIDING A RADIO LINK CONTROL SUBLAYER

(71) Applicant: Space Exploration Technologies Corp., Hawthorne, CA (US)

(72) Inventors: Jeffrey A. Gardner, Mountain View, CA (US); Yashodhan Dandekar, Cupertino, CA (US); Ramakrishna Akella, San Diego, CA (US); Khasim Shaheed Shaik Mahammad, Milpitas, CA (US)

(73) Assignee: Space Exploration Technologies Corp., Hawthorne, CA (US)

( * ) Notice: Subject to any disclaimer, the term of this patent is extended or adjusted under 35 U.S.C. 154(b) by 0 days.

(21) Appl. No.: 17/339,807

(22) Filed: Jun. 4, 2021

Related U.S. Application Data

(60) Provisional application No. 63/035,193, filed on Jun. 5, 2020.

(51) Int. Cl.
*H04W 28/06* (2009.01)
*H04L 1/00* (2006.01)
*H04W 80/02* (2009.01)
*H04W 84/06* (2009.01)

(52) U.S. Cl.
CPC ......... *H04L 1/0025* (2013.01); *H04W 28/065* (2013.01); *H04W 80/02* (2013.01); *H04W 84/06* (2013.01)

(58) Field of Classification Search
None
See application file for complete search history.

(56) References Cited

U.S. PATENT DOCUMENTS

| 10,104,579 | B1 * | 10/2018 | Cho | H04W 28/065 |
|---|---|---|---|---|
| 2003/0212827 | A1 * | 11/2003 | Saha | H04L 9/40 709/247 |
| 2007/0104129 | A1 * | 5/2007 | Yang | H04L 1/188 370/329 |
| 2018/0006710 | A1 * | 1/2018 | Buer | H04B 7/18517 |

FOREIGN PATENT DOCUMENTS

| EP | 1764942 A2 * | 3/2007 | H04L 1/1635 |
|---|---|---|---|
| EP | 1959601 A1 * | 8/2008 | H04L 1/0083 |
| GB | 2484772 A * | 8/2011 | H04L 1/16 |

* cited by examiner

*Primary Examiner* — Anh Vu H Ly
(74) *Attorney, Agent, or Firm* — Polsinelli PC

(57) ABSTRACT

Systems, methods, and techniques are provided for a radio link control (RLC) sublayer. An example satellite or user terminal can include a divisional of layer 2 of the OSI protocol layer structure. An example method includes providing a RLC sublayer on top of a MAC sublayer and adaptively switching, via the RLC sublayer and based on external data, between an unacknowledged mode and an acknowledged mode for the electronic communications. If the RLC sublayer is operating in the unacknowledged mode, the RLC sublayer provides one or more of (1) fragmentation and reassembly of service data units; (2) a use of RLC headers; and/or (3) no delivery guarantees. If the RLC sublayer is operating in the acknowledged mode, the RLC sublayer provides reliability in a sequence delivery service and one or more of (1) fragmentation and reassembly of service data units; and/or (2) the use of RLC headers.

15 Claims, 10 Drawing Sheets

SYSTEM AND METHOD OF PROVIDING A RADIO LINK CONTROL SUBLAYER

CROSS-REFERENCE TO RELATED APPLICATIONS

This application claims priority to U.S. Provisional Patent Application No. 63/035,193, filed on Jun. 5, 2020, entitled "SYSTEM AND METHOD OF PROVIDING A RADIO LINK CONTROL SUBLAYER", the contents of which are hereby incorporated by reference in their entirety and for all purposes.

TECHNICAL FIELD

The present disclosure introduces the concept of splitting the layer 2 functionality of the OSI (Open Systems Interconnection) model for wireless communications into a MAC (Media Access Control) layer and a new radio link control sublayer with an adaptive acknowledgement mode that is adjusted based on link quality.

BACKGROUND

The Open Systems Interconnection model (OSI model) is a conceptual model that defines the communication functions of a telecommunication or computing system without regard to its underlying internal structure and technology. The goal of the OSI model is to enable the interoperability of diverse communication systems with standard communication protocols. The model partitions a communication system into abstraction layers.

Under the OSI model, a respective layer serves the layer above it and is served by the layer below it. For example, a layer that enables error-free communications across a network can provide the path needed by applications above it, while that layer calls the next lower layer to send and receive packets that constitute the contents of that path. The OSI model includes a physical layer 1, a data link layer 2, a network layer 3, a transport layer 4, a session layer 5, a presentation layer 6 and an application layer 7.

Layer 2 of the OSI model is the data link layer that provides node-to-node data transfer. It detects and possibly corrects errors that may occur in the physical layer. It defines the protocol to establish and terminate a connection between two physically connected devices. Layer 2 also defines the protocol for flow control between the devices.

Layer 2 was originally designed for terrestrial (earth-based) communications including wireless communications for cell phone use. The distances are not far in this context. Wireless communication between a land-based device and a satellite introduce much larger distances. More complexity is added to wireless broadband communication links between a terrestrial unit and a satellite. The added complexity impacts the current layer 2 processing of the OSI model when applied to satellite data communications.

Functions performed by layer 2 include framing network layer data packets, flow control, multiple access control using CSMA/CD (Carrier Sense Multiple Access/Collision Detection) in wired networks and CSMA/CA (Collision Avoidance) in wireless networks, physical addressing, switching, quality of service (QoS) and virtual local area networks (VLANs).

Some networks have divided the data link layer 2 into two sublayers. For example, the IEEE 802 standard (an industry standard from the Institute of Electrical and Electronic Engineers that covers local area networks and metropolitan area networks) divides the data link layer into two sublayers: (1) a Medium Access Control (MAC) sublayer—responsible for controlling how devices in a network gain access to a medium and permission to transmit data and (2) a Logical Link Control (LLC) sublayer that is responsible for identifying and encapsulating network layer protocols, and controls error checking and frame synchronization. However, the existing division does not properly address the complexities in layer 2 processing in connection with satellite communications due to the additional delay in the data transmission. Such delays are a smaller factor in terrestrial communications.

BRIEF DESCRIPTION OF THE DRAWINGS

In order to describe the manner in which the various advantages and features of the disclosure can be obtained, a more particular description of the principles briefly described above will be rendered by reference to specific embodiments thereof that are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
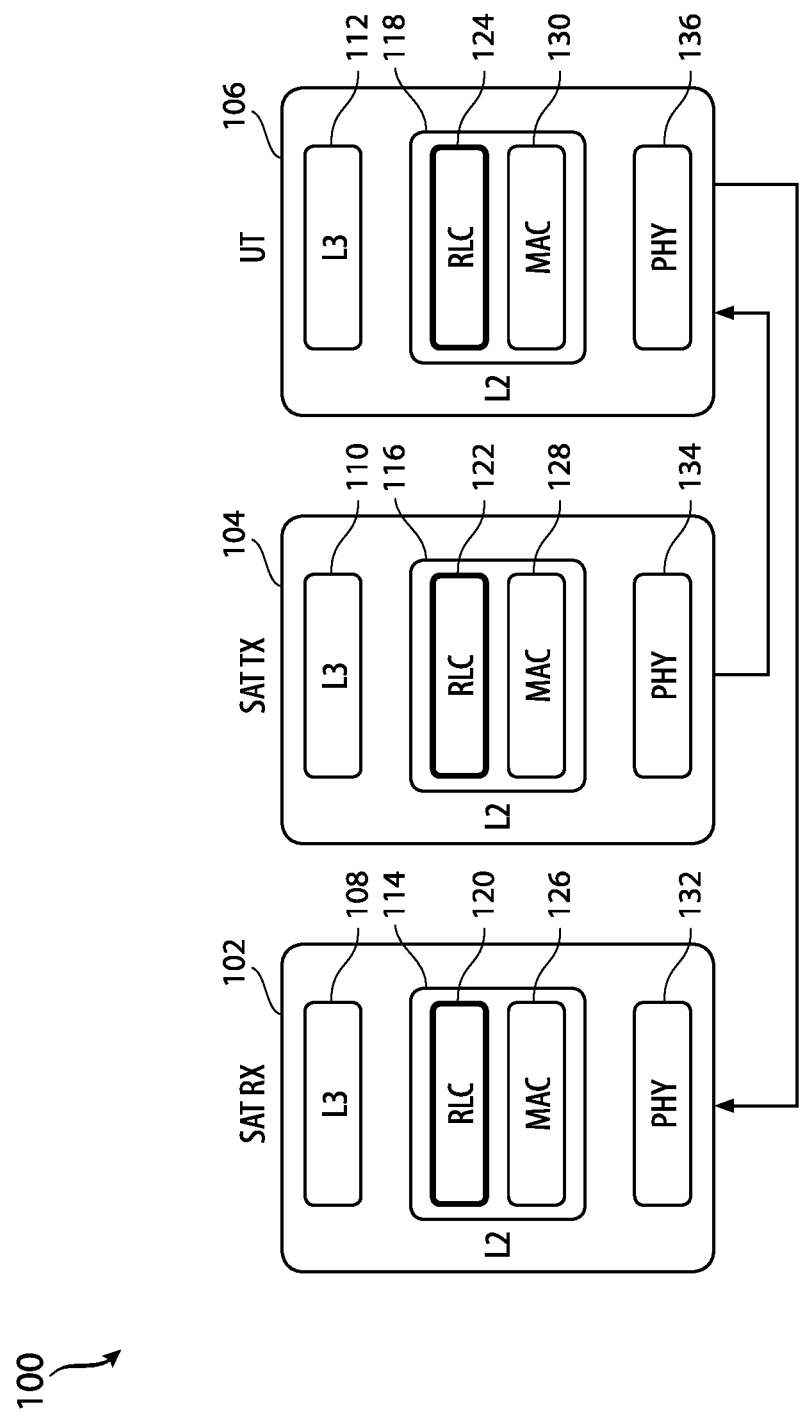
FIG. 1 illustrates an example radio link control layer as part of layer 2 for satellite and user terminal devices, in accordance with some examples of the disclosure.

Various example embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the example embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative example embodiments mutually exclusive of other example embodiments. Moreover, various features are described which may be exhibited by some example embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various example embodiments given in this specification.

Without intent to limit the scope of the disclosure, examples of instruments, apparatus, methods and their related results according to the example embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

For clarity of explanation, in some instances the present technology may be presented as including individual functional blocks including functional blocks comprising devices, device components, steps or routines in a method embodied in software, or combinations of hardware and software.

Overview

The Present Disclosure Addresses the Issue Raised Above with Respect to the Complexity involved in managing wireless broadband communication links in the current data link layer 2 of the OSI model, or in the current division of layer 2 functionality with the logical link control. Some of the complexity includes the addition of segmentation and reassembly of packets and the possibility of adding lost or corrected packets using PDU (protocol data unit) detection and correction. A PDU is a single unit of information transmitted among devices in a computer network. It includes protocol-specific control information and the ultimate user data to be transmitted. In order to better manage the additional functionality related to segmentation and reassembly of packets and packet correction, this disclosure introduces an approach to splitting the layer 2 functionality in a different way than is described above. A new radio link control (RLC) sublayer is introduced as part of layer 2 that will prevent the generation of an overly complex super layer that becomes harder and harder to manage and maintain. This new RLC sublayer can replace the logical link control sublayer mentioned above or can be an additional sublayer to the MAC sublayer and the LLC sublayer.

The RLC sublayer will sit above the existing MAC sublayer and be responsible for managing the service data units (SDUs) as they traverse to layer 2 from layer 3 on one node and traverse in the opposite direction from layer 2 to layer 3 on another node. As data moves from layer to layer, a MAC sublayer PDU becomes a physical layer service data unit (SDU). The RLC protocol disclosed herein will be tunneled via the MAC PDU from one node and will be terminated at the RLC sublayer of another node. The method, computer module, software, or system can be part of a satellite system or part of a computing device on earth such as a user terminal, a gateway, a mobile device, or other device. Each device operates layer 2 of the OSI protocol and can thus be modified with the new RLC sublayer described herein.

An example method includes providing a radio link control sublayer on top of a Medium Access Control (MAC) sublayer of a layer 2 protocol for electronic communications. The method can include one or more steps of adaptively switching, via the RLC sublayer and based on external data, between an unacknowledged mode and an acknowledge mode for the electronic communications. When the RLC sublayer is operating in the unacknowledged mode, the RLC sublayer can provide one or more of (1) fragmentation and reassembly of service data units; (2) a use of RLC headers; and (3) no delivery guarantees. This mode does not provide any additional reliability to the layer. In this case, if a packet gets dropped, there is no resending of the packet and that packet just gets dropped.

When the RLC sublayer is operating in the acknowledged mode, the RLC sublayer can provide reliability in a sequence delivery service and one or more of (1) fragmentation and reassembly of service data units; and (2) the use of radio link control headers. The system in this case can use a windowing protocol to detect and correct (retransmit) for dropped packets. This mode provides additional reliability to the wireless link.

The resources required to run an acknowledged mode all the time are large. Running a feedback loop in the acknowledged mode can take a long time in satellite communications given the distances the signals travel. The memory requirement for buffering enough data to enable the retransmission of dropped packets also goes up and becomes unworkable. Thus, where the link conditions are good and packets are not being dropped, the system can switch to unacknowledged mode. If conditions change or there is a trend in a direction of more dropped packets, and/or in some cases where a threshold is met, the system can switch to the acknowledged mode. Other modes can be included as well.

An example of the external data can be a link quality between a user terminal and a satellite. The system can utilize data such as the strength of a received signal or other indicator of link quality. In one aspect, the external data can refer to a trend in a link quality between a user terminal or other device like a gateway and a satellite.

Adaptively switching between the unacknowledged mode and the acknowledged mode for the electronic communications further can include switching from the unacknowledged mode to the acknowledged mode in order to improve network reliability to a quality of service level. This adaptive mode approach in the new RLC sublayer resolves the unique problem of high latency links due to the distances involved in satellite communication.

DESCRIPTION OF DETAILED EMBODIMENTS

Generally, this disclosure relates to addressing the problems outlined above with respect to the added complexity to wireless broadband communication links between terrestrial nodes and a satellite. Satellite systems introduce some unique problems that are not seen with the traditional lower latency terrestrial wireless links. With high latency links caused by the distances involved, the buffer management required to implement error correction through automatic repeat requests does not easily scale to allow all active flows to operate in the acknowledge mode at the same time. This issue coupled with the addition of segmentation and reassembly and the possibility of adding lost or corrupted PDU detection and correction results in the need to split the layer 2 functionality into specialized sublayers in a manner different from the layer 2 split mentioned in the Introduction above.

Adding a sublayer can prevent the generation of an overly complex superlayer that becomes difficult to manage and maintain. FIG. 1 illustrates the various systems 100 that each include a new radio link control (RLC) sublayer (120, 122, 124) as part of layer 2 for satellite 102, 104 and user terminal devices 106. In this example, a satellite 102, 104 is represented with its separate receive component 102 with its receive layers 132, 114, 108 and transmit component 104 with its transmit layers (134, 116, 110). The satellite 102, 104 includes a physical layer 132, 134 and a layer 2 114, 116 that includes the MAC sublayer 126, 128 and the RLC sublayer 120, 122. A third layer 108, 110 is also shown. Layer 3 108, 110 is typically the network layer that provides the functional and procedural means for transferring variable length data sequences from one node to another in different networks. The physical layer PHY 132 first processes the received data from a user terminal 106. The PHY layer 132 is responsible for the transmission and reception of unstructured raw data between a device and a transmission medium like the air interface or in some cases a copper or fiber cable where the communication is wired. The user terminal 106 also includes a physical layer 1 136, layer 2 118 with its MAC sublayer 130 and RLC sublayer 124, as well as a layer 3 112. The user terminal 106 transmits and receives data with the satellite 102,104. Satellite 104 represents the transmission stack which includes the layer 3 110 and the layer 2 116 having an RLC sublayer 122 sitting on top of the MAC sublayer 128, and the physical layer 134 such that data can be transmitted from the satellite 104 to the user terminal 106.

As noted above, the RLC sublayer (120, 122, 124) can be configured above the existing MAC sublayer (126, 128, 130) and be responsible for managing service data units (SDUs) as they traverse layer 2 (114, 116, 118) from layer 3 (108, 110, 112) on one node and from layer 2 (114, 116, 118) to layer 3 (108, 110, 112) on another node. A node can represent any device such as a satellite 102, 104, a user terminal 106 or another device that communicates over an air interface with the satellite 102, 104 or other device. The RLC protocol will be tunneled via the MAC PDU from one node and will be terminated at the RLC sublayer on another node.

In the sublayer structure disclosed herein, most of the existing functionality of the MAC sublayer will remain. For example, the MAC sublayer (126, 128, 130) will continue to perform beam multiplexing, user terminal grouping, scheduling, encoding/decoding, and other functions.

The RLC sublayer (120, 122, 124) will be responsible for managing ingress (from the point of view of the MAC sublayer) SDUs. In other words, the RLC sublayer will place the SDUs on the per SID/SFID queue (SID is the Service ID and the SFID is the MAC Service Flow Identifier). If some sort of quality of service (QoS) or random early detection (RED) is needed for processing data, the RLC sublayer (120, 122, 124) can manage this functionality. The RLC sublayer (120, 122, 124) can provide SDU fragmentation and reassembly. Fragmentation is a process used to partition messages (the SDU or a packet) from one layer of a network into multiple smaller payloads that can fit within the lower layer's protocol data unit (PDU). Every network link has a maximum size of messages that may be transmitted, called the maximum transmission unit (MTU). If the SDU plus metadata added at the link layer exceeds the MTU, the SDU is fragmented. The fragmented data is later reassembled. The RLC sublayer (120, 122, 124) can also perform SDU concatenation as well as part of this process. The RLC sublayer (120, 122, 124) can use both SDU concatenation and SDU fragmentation simultaneously (or not) in order to fully utilize the PDU's MTU.

The RLC sublayer (120, 122, 124) may also introduce an RLC PDU fragmentation and reassembly functionality. The RLC sublayer can also provide error correction through the automatic repeat request (ARQ) protocol. Other functionality can include reordering of RLC PDUs and duplicate detection.

Figure 2:
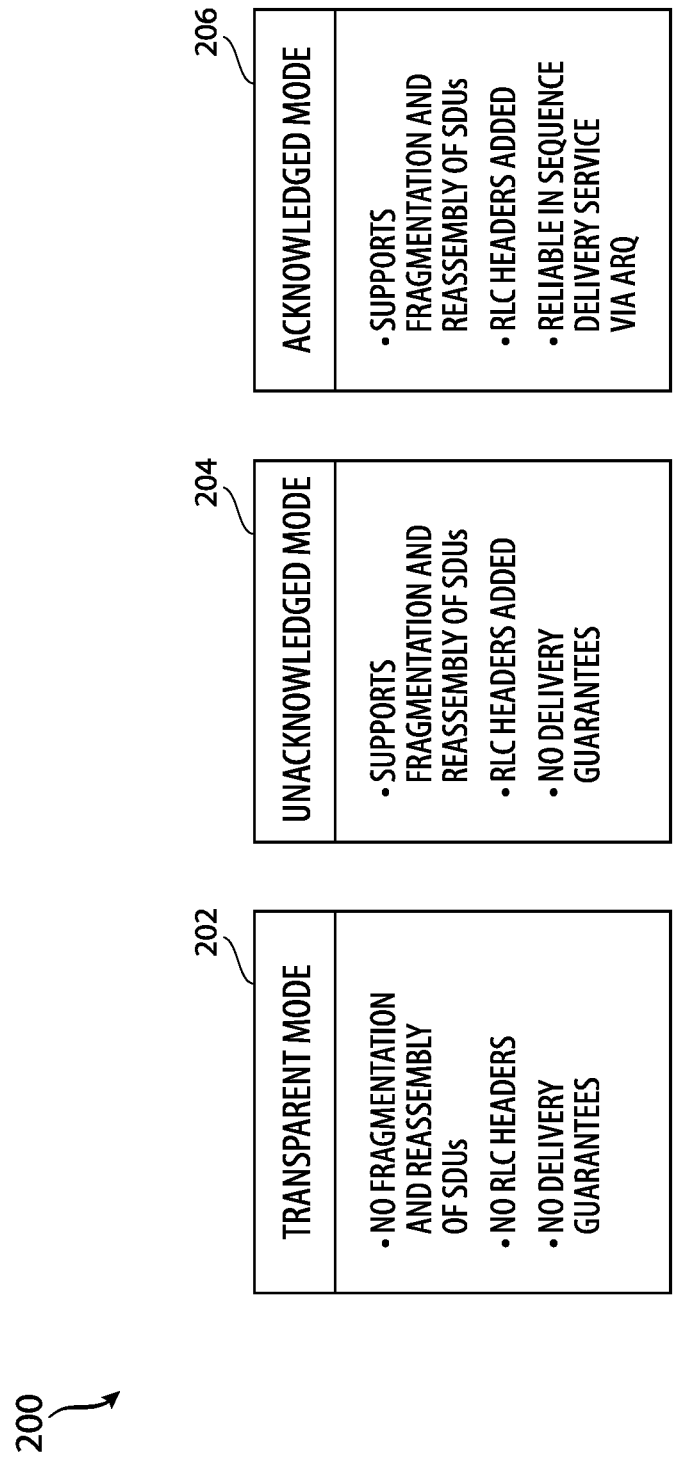
FIG. 2 illustrates the various modes of an example radio link control layer, in accordance with some examples of the disclosure.

FIG. 2 illustrates the various modes 200 of the RLC sublayer, such as any of RLC sublayer (120, 122, 124). The present disclosure relates to adaptive adjustment between two or more of the modes 200. On a per SID/SFID (RLC Flow) basis, the RLC sublayer (120, 122, 124) can be configured to operate to switch between two, three or more modes. A first example mode 202 is a transparent mode in which the functionality includes no fragmentation and reassembly of SDUs, no use of RLC headers and no delivery guarantees. This mode may implement one or more of these features.

An unacknowledged mode 204 can include one or more functions of supporting fragmentation and reassembly of SDUs, the addition of RLC headers and no delivery guarantees. The acknowledged mode 206 can include one or more of supporting fragmentation and reassembly of SDUs, adding RLC headers and providing network reliability in sequence delivery service via the automatic repeat request (ARQ) functionality.

Automatic repeat request (ARQ) is also known as automatic repeat query. The ARQ is an error-control method for data transmission that uses acknowledgements (messages sent by the receiver indicating that it has correctly received a packet) and timeouts (specified periods of time allowed to elapse before an acknowledgment is to be received) to achieve reliable data transmission over an unreliable service. In one example, if a sending node does not receive an acknowledgment before the timeout, the sending node usually re-transmits the packet until the sending node receives an acknowledgment or exceeds a predefined number of retransmissions.

The types of ARQ protocols include Stop-and-wait ARQ, Go-Back-N ARQ, and Selective Repeat ARQ/Selective Reject ARQ. All three protocols usually use some form of sliding window protocol to tell the transmitting node to determine which (if any) packets need to be retransmitted.

These protocols typically reside in the data link or transport layers (layers 2 and 4) of the OSI model. In this disclosure, this functionality is moved to the RLC sublayer (120, 122, 124) and additionally, the RLC sublayer is adaptive between, for example, the unacknowledged mode 204 and the acknowledged mode 206.

As noted above, the high latency inherent in satellite wireless communication systems introduces unique problems not experienced in traditional lower latency terrestrial wireless links. Buffer management issues that are required to normally implement ARQ in an acknowledgment mode does not easily scale to allow all active flows to operate in the acknowledge mode at the same time. This disclosure introduces the RLC sublayer (120, 122, 124) configured to support an adaptive mode in which it can automatically switch between an unacknowledged mode 204 and in acknowledged mode 206 based on an external stimuli or data.

One example external stimuli or data can include the link quality to a given user terminal 106. The evaluation of the link quality typically will occur on the respective receiving device of the transmitted signal. In another example, as the link quality to the given user terminal 106 starts to degrade, then the RLC sublayer (120, 122, 124) can automatically switch from operating in an unacknowledged mode 204 to an acknowledged mode 206 in order to preserve the network reliability necessary to preserve quality user experience. In one example, when a mode is switched as described herein, each of the RLC sublayers (120, 122, 124) switch to the same mode. In another example, one or more of the RLC sublayers (120, 122, 124) make the switch.

The RLC sublayer (120, 122, 124) can also switch between two or more modes which can include the transparent mode 202. This is an optional variation on the structure and functionality of the RLC sublayer (120, 122, 124).

The external stimuli or data can also include other data. For example, one or more of the following parameters can impact or be weighted in the analysis of whether to switch between modes via the RLC sublayer: (1) the number of users communicating on a channel or with a satellite; (2) a quality of service established for one or more users of a wireless link; (3) a time of day; (4) current events such as a need for quality communications during an emergency; (5) a geographic location of one or more user terminals; and (6) any characteristic of a wireless link beyond link quality. These and other factors can be encompassed within the term external stimuli.

In an unacknowledged mode, the system can look at a clock rate as an indicator of link quality. The system can evaluate the signal to noise ratio (SNR), or a perceived packet drop rate (at any device). When a threshold is met with respect to a perceived packet drop rate (or any of the above factors), the system can switch modes. A user might be also at a cell edge, and be dropping packets that may be detected or determined directly rather than inferentially, and cause the system to switch to an acknowledged mode. In one aspect, if a device is at a cell edge, a more aggressive coding scheme might be implemented, which provides better throughput. Particular coding schemes might include BPSK (binary phase shift keying), QPSK (quadrature phase shift keying), 16 QAM (quadrature amplitude modulation), 32 QAM and so forth. A particular acknowledgment mode might be preferable for a given coding scheme. Thus, the geographic position of the device or these other aspects can play a role in switching modes. Any one or more of these factors can be used to determine when to switch modes.

Figure 3:
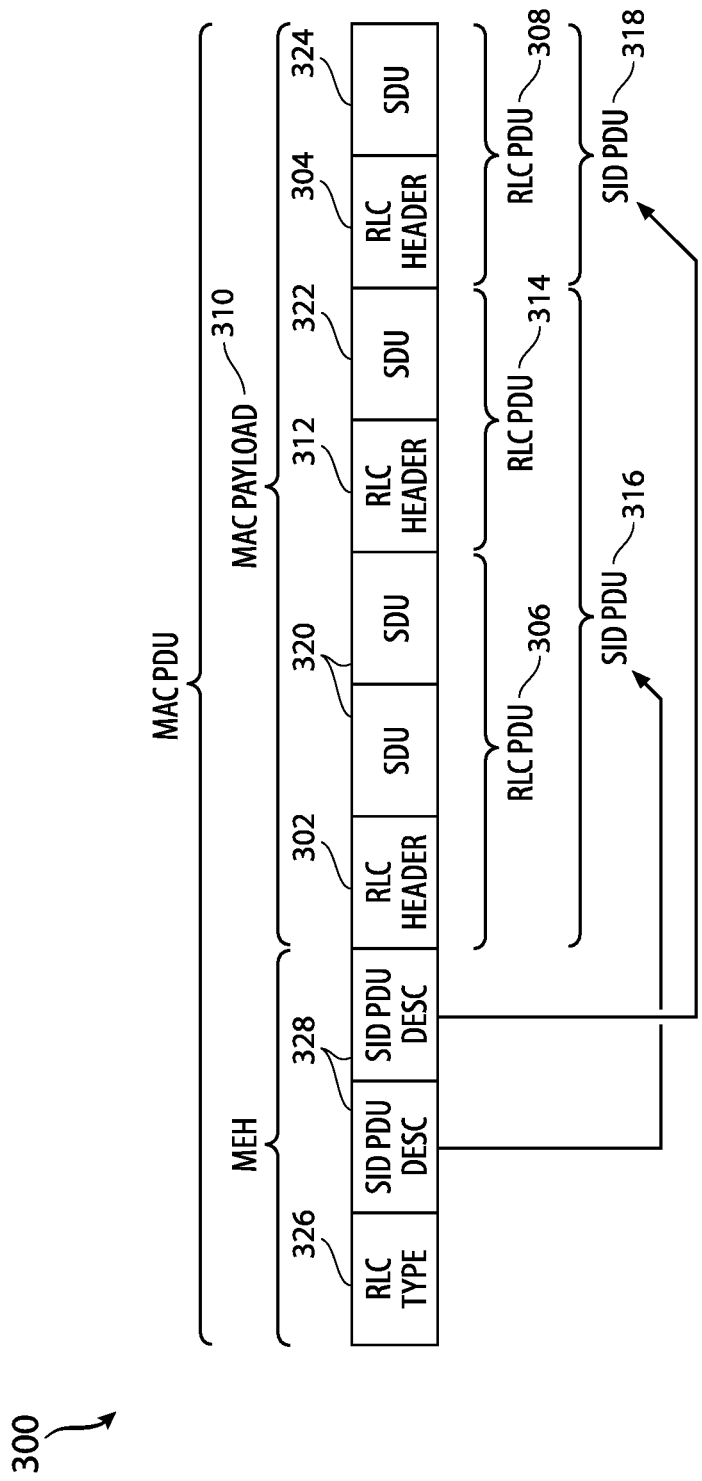
FIG. 3 illustrates an example header structure for the use of an example radio link control protocol, in accordance with some examples of the disclosure.

FIG. 3 illustrates an example header structure 300 for the use of the radio link control protocol. This example MAC PDU 300 contains data for two SIDs. The first SID 316 contains two SFIDs or RLC flows 306, 314. The first RLC flow 306 has an RLC header 302 and two SDUs 320 and the second RLC flow 314 has an RLC header 312 and one SDU 322. The second SID 318 contains a single RLC flow 308 having an RLC header 304 with a single SDU 324.

The RLC type 326 can be a new member of the MEH_TYPES used indicating that a list of RLC SID descriptors is to follow. MEH stands for multiplexing extended headers. The SID PDU Desc 328 can refer to a data block used to describe SID PDUs 316, 318, which is a SID and an offset into a MAC PDU payload. The RLC PDU (306, 308, 314) can refer to a logical entity that maintains an aggregation of the RLC header and all the SDUs for an RLC flow. The RLC Header (302, 312, 304) can refer to a data block used to describe the RLC PDU (306, 308, 314) for the given flow (SDI/SFID pair). FIG. 3 illustrates an example header structure for a MAC PDU that can be used in connection with the RLC sublayer (120, 122, 124). Other structures are also contemplated and the structure provided is an example only.

Figure 4A:
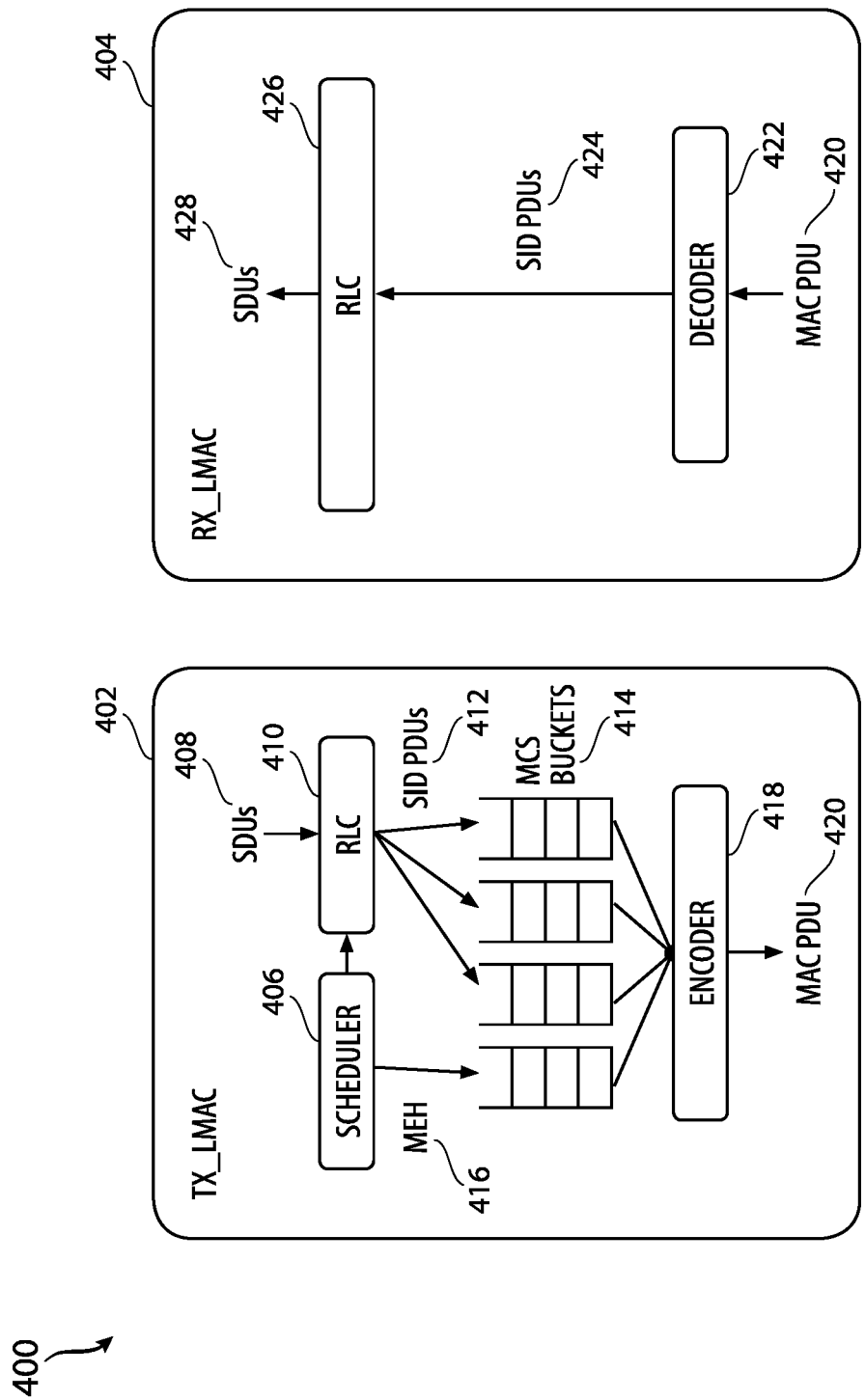
FIG. 4A illustrates an example integration of a radio link control protocol with a MAC software component, in accordance with some examples of the disclosure.

FIG. 4A illustrates the integration of the RLC protocol 400 with MAC software component. In a TX_LMAC (transmission lightweight medium access protocol component) 402, SDUs 408 are received at the RLC sublayer 410. A scheduler 406 communicates instructions data to the RLC sublayer 410 and MEH data 416 to MCS (modulation and coding scheme) buckets 414. The RLC sublayer 410 receives grants for each SID/SFID pair from the scheduler 406. A scheduler 406 on the satellite via the grant allocates the radio resources to the user terminal and other user terminals (not shown). A particular user terminal can be granted a portion of a radio frame on an uplink channel for communication of data to a satellite. The radio frame can also be shared with other user terminals with their respective grants of a portion of the frame for their data. The channel quality directly impacts the amount of resources the scheduler 406 needs to allocate for a given user terminal. For example, if the channel quality is good, less radio resources are needed to communicate a certain amount of information. Conversely, if the channel quality is bad, then more radio resources are needed to transmit the same amount of data.

The RLC sublayer 410 takes the SID/SFID pair and maps it to the RLC flow, takes the grant from the scheduler 406 and generates a RLC PDU containing the RLC header and the required SDUs, fragmenting as necessary to fulfill the grant. The RLC sublayer 410 then aggregates the RLC PDUs into a SID PDU 412. The RLC sublayer 410 will produce SID PDUs 412 that are placed into the appropriate MCS buckets 414. The encoder 418 then will encode the data and generate the MAC PDU 420 to the transmitted over the air interface.

An RX_LMAC (receiver transmission lightweight medium access protocol component) 404 can receive the MAC PDUs 420, and decode them using the decoder 422 into SID PDUs 424. The RLC sublayer 426 receives the SID PDUs 424 and further decomposes them into SDUs 428, reassembling fragmented SDUs as necessary, and delivers the SDUs to layer 3 (not shown). The TX_LMAC 402 can be, for example, configured as part of the satellite transmission unit 104 or as part of a transmission unit in the user terminal 106 in FIG. 1. The RX_LMAC 404 can be, for example, configured as part of the user terminal 106 or as part of the satellite receiving component 102.

Generally, regardless of the RLC mode, all RLC headers start with a same generic format. This will allow the RLC code to find the SFID used to determine the RLC flow and thus the RLC mode and expected RLC format. Following the generic portion of the header is the mode specific portion used to describe the rest of the RLC PDU. In one aspect, the structure of the RLC header can change depending on whether the system is in the unacknowledged mode or the acknowledged mode. In one example, in the unacknowledged mode, after the RLC generic header, the structure can include a sequence number and SDU fragmentation information followed by SDU descriptors and the SDUs for an RLC PDU.

In contrast, an RLC header in the acknowledged mode can include a number of flags. For example, one or more of the following flags can be included in a header. A poll flag can be used to indicate that the RLC transmit entity is requesting a status poll. Another flag (such as a status flag or SP) can be used to indicate that there are status SDUs in the RLC PDU. Another flag (such as a fragments poll flag or FP flag) can be used to indicate that there are RLC PDU fragments in the associated RLC PDU. Yet another flag (such as a data poll flag or DP flag) can be used to indicate that there are data SDUs in the associated RLC PDU. A sequence number can be provided as well as SDU fragmentation information. Depending on the status of respective flags, the header can include such information as a chain of RLC fragment descriptors if the FP flag is set to 1. If the SP flag is set to 1, then the header can include a chain of status SDU descriptors. If the DP flag is set to 1, then the header can include a chain of SDU descriptors.

Figure 4B:
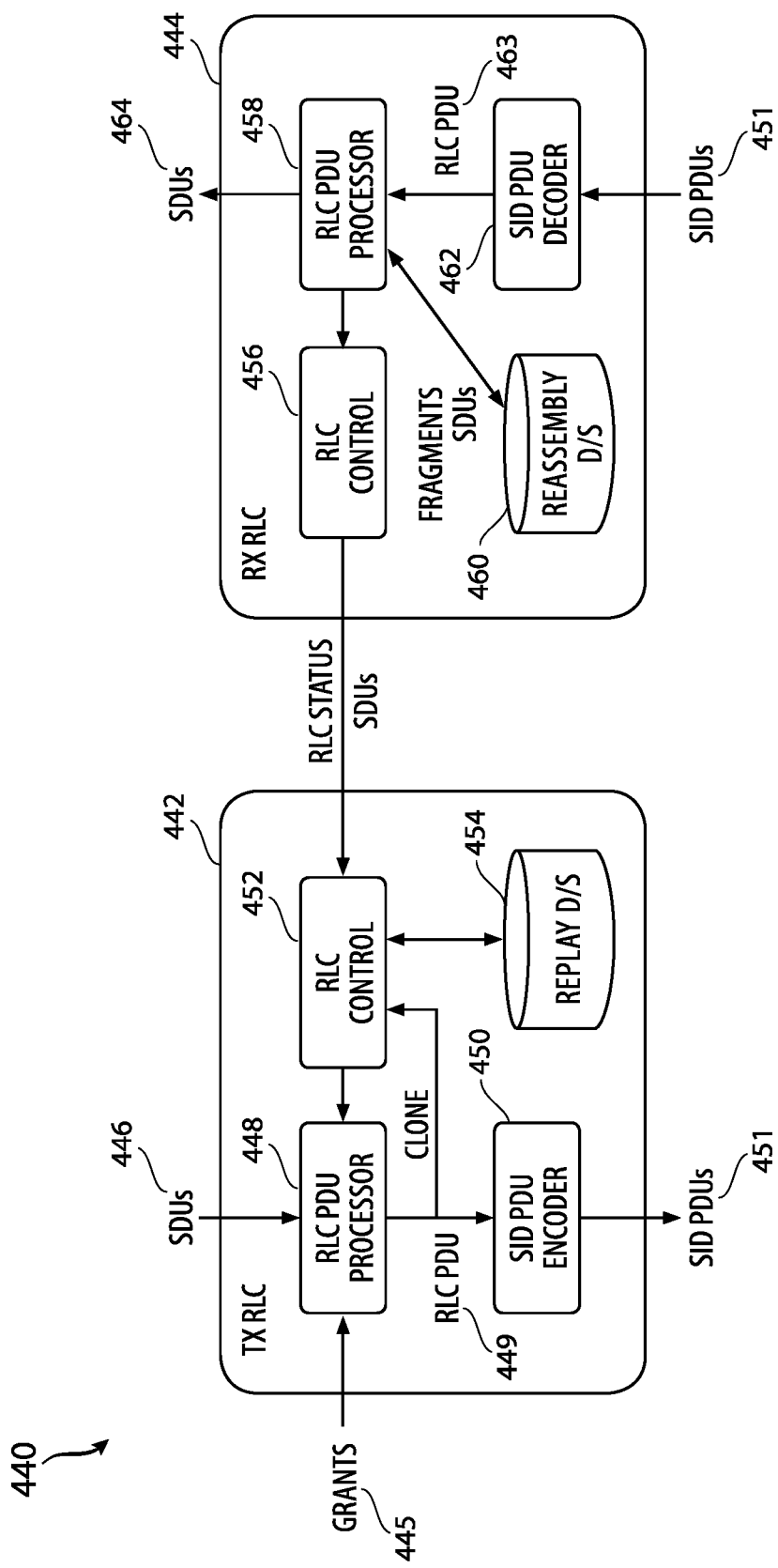
FIG. 4B illustrates an example partitioning of the components of the radio link control protocol, in accordance with some examples of the disclosure.

FIG. 4B illustrates an example partitioning 440 of the components of the radio link control protocol. The transmit RLC sublayer 442 illustrates a transmission version of the sublayer that receives SDUs 446 as well as grants 445 at the transmission RLC PDU processor 448. Grants refer to where in a data frame on an uplink channel communication between the user terminal 106 and the satellite 102 will a user's data be positioned relative to other users' data in the frame. The processor associated with the transmit RLC sublayer 442 is responsible for generating the RCL PDUs 449 based on the size of the grant 445 given to it by the scheduler 406 (shown in FIG. 4A). The processor 448 is responsible for segmentation of the SDU 446 if necessary. The processor 448 interacts with the RLC control unit 452 to retransmit dropped PDUs and to inject RLC status SDUs into the RLC PDU 449. A priority can be provided based on RLC status SDUs taking precedence over data SDUs. The priority can also be based on a retransmit RLC PDU 449 taking precedence over new RLC PDUs. The RLC control unit 452 can interact with a replay data/store component 454 which maintains a list of all unacknowledged RLC PDUs. The SID PDU encoder 450 receives the RLC PDUs 449, encodes them and produces the SID PDUs 451 that are transmitted. The SID PDU encoder 450 is responsible for aggregating the RLC PDUs generated by the transmission RLC PDU processor 448 into a single SID PDU that is delivered to a MAC layer (not shown in FIG. 4B) to be inserted into a MAC PDU 420.

The receive RLC sublayer 444 receives SID PDUs 451 and SID PDU decoder 462 is responsible for decoding the SID PDUs into RLC PDUs and passing them on to the receive RLC PDU processor 458. The receive RLC PDU processor 458 communicates with the RLC control unit 456 and, where necessary, fragmented SDUs are reassembled by reassembly data/store 460. The RLC control unit 456 is responsible for managing the RLC sliding window required for the ARQ. Through the use of the ACKs (acknowledgments) and NACKs (no acknowledgements) that are part of the RLC status SDU, the RLC control unit 456 maintains a list of unacknowledged transmitted RLC PDUs.

The receive RLC PDU processor 458 outputs SDUs 464. The receive RLC sublayer 444 will decompose the SID PDUs 451 into RLC PDUs 463 and further into SDUs 464 for delivery to layer 3 (not shown in FIG. 4B). The managing and reassembly data/store component 460 allows for RLC PDUs 463 and SDUs to be reassembled. The RX_RLC 444 is responsible for maintaining a list of active SDU segment chains and reassembling the completed SDUs 464. In the absence of an ARQ, the reassembly data/store component 460 is simplified because a given RLC flow can only have one active segment chain and all segments will be received in order. The restriction that all segments are received in order causes the segment chain to degenerate to an order of arrival queue and if the new segment's sequence number does not match the expected sequence number, this is an error and the system drops the chain and continues. In addition, if the system only has to manage one segment chain per flow, then the maximum active segment chains can be set to a manageable number without having to implement any complex data structures. The receive RLC sublayer 444 guarantees "in order" SDU 464 delivery to layer 3.

In one aspect, an RLC status SDU can be communicated from the RLC control 456 of the receive RCL sublayer 444 to the RCL control unit 452 of transmit RLC sublayer 442.

Figure 5A:
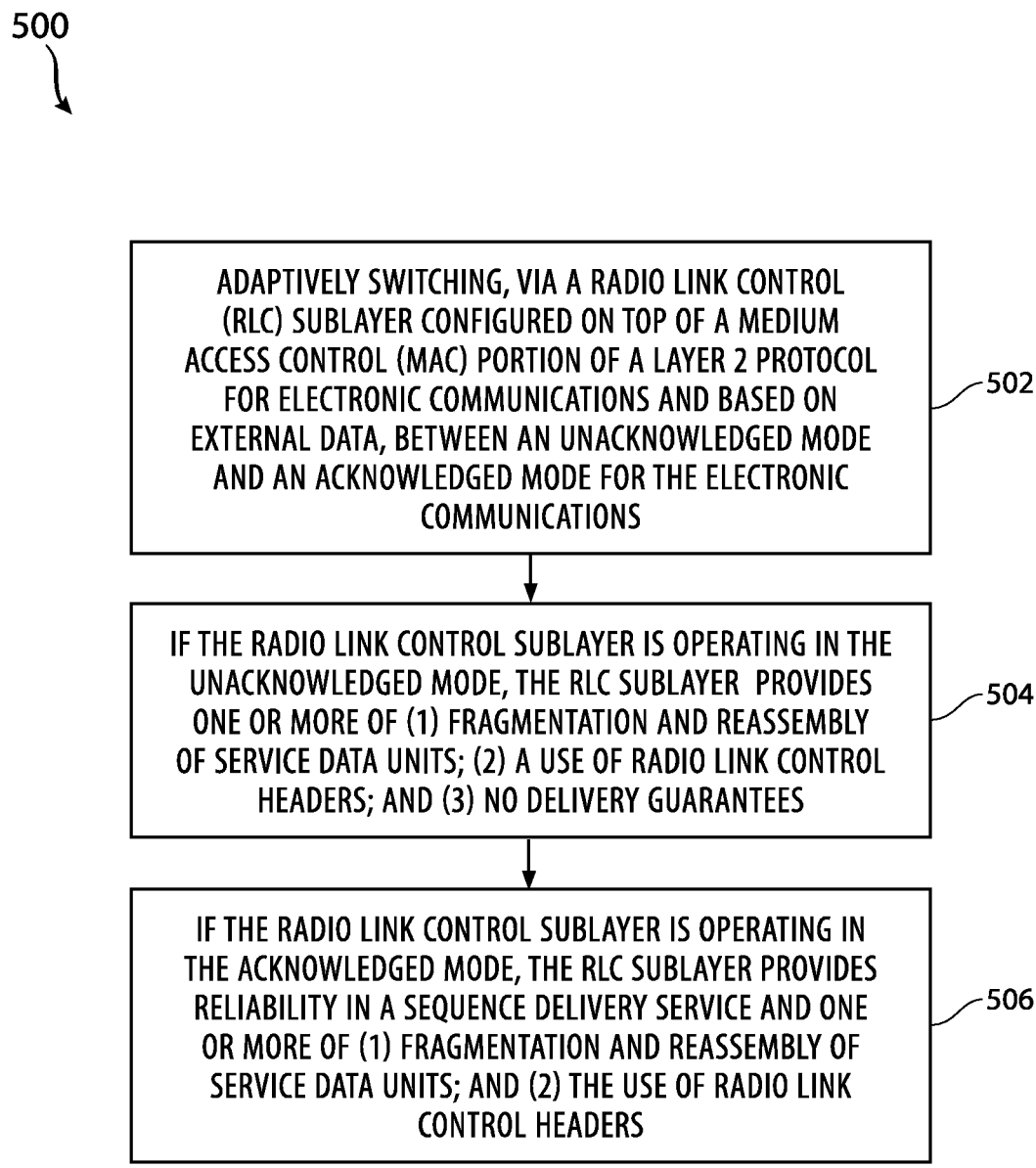
FIG. 5A through FIG. 5D illustrate example methods for providing a radio link control protocol embodiment, in accordance with some examples of the disclosure.

FIG. 5A illustrates an example method 500. The example method 500 includes adaptively switching, via a radio link control (RLC) sublayer configured on top of a Medium Access Control (MAC) sublayer of a layer 2 protocol for electronic communications and based on external data, between an unacknowledged mode and an acknowledged mode for the electronic communications (502), if the RLC sublayer is operating in the unacknowledged mode, the RLC sublayer provides at least one of (1) fragmentation and reassembly of service data units; (2) a use of RLC headers; and (3) no delivery guarantees (504) and if the radio link control sublayer is operating in the acknowledged mode, the RLC sublayer provides reliability in a sequence delivery service and one or more of (1) fragmentation and reassembly of service data units; and (2) the use of RLC headers (506).

In some examples, the external data can include a link quality associated with a link between a user terminal and a satellite, a clock rate associated with the link, a signal-to-noise ratio (SNR) associated with the link, a packet drop rate, a trend in the link quality associated with the link between the user terminal and the satellite, a quality-of-service associated with a link between a user terminal and a satellite, a number of user terminals communicating on a channel associated with the satellite, a number of user terminals communicating with the satellite, a time associated with one or more electronic communications, one or more current events (e.g., an emergency, a need/desire for a different quality of service, etc.), a desired quality-of-service, a geographic location of one or more user terminals in communication with the satellite, one or more characteristics of a wireless link associated with the satellite, and/or any other factor(s). In some examples, the one or more characteristics of the wireless link can include a performance, a connection quality, an error rate, a latency, a connection time, one or more priorities, one or more types of data traffic, and/or any other characteristics.

These steps can also be performed as operations by a computer processor as instructed by instructions stored in a computer-readable storage device.

Figure 5B:
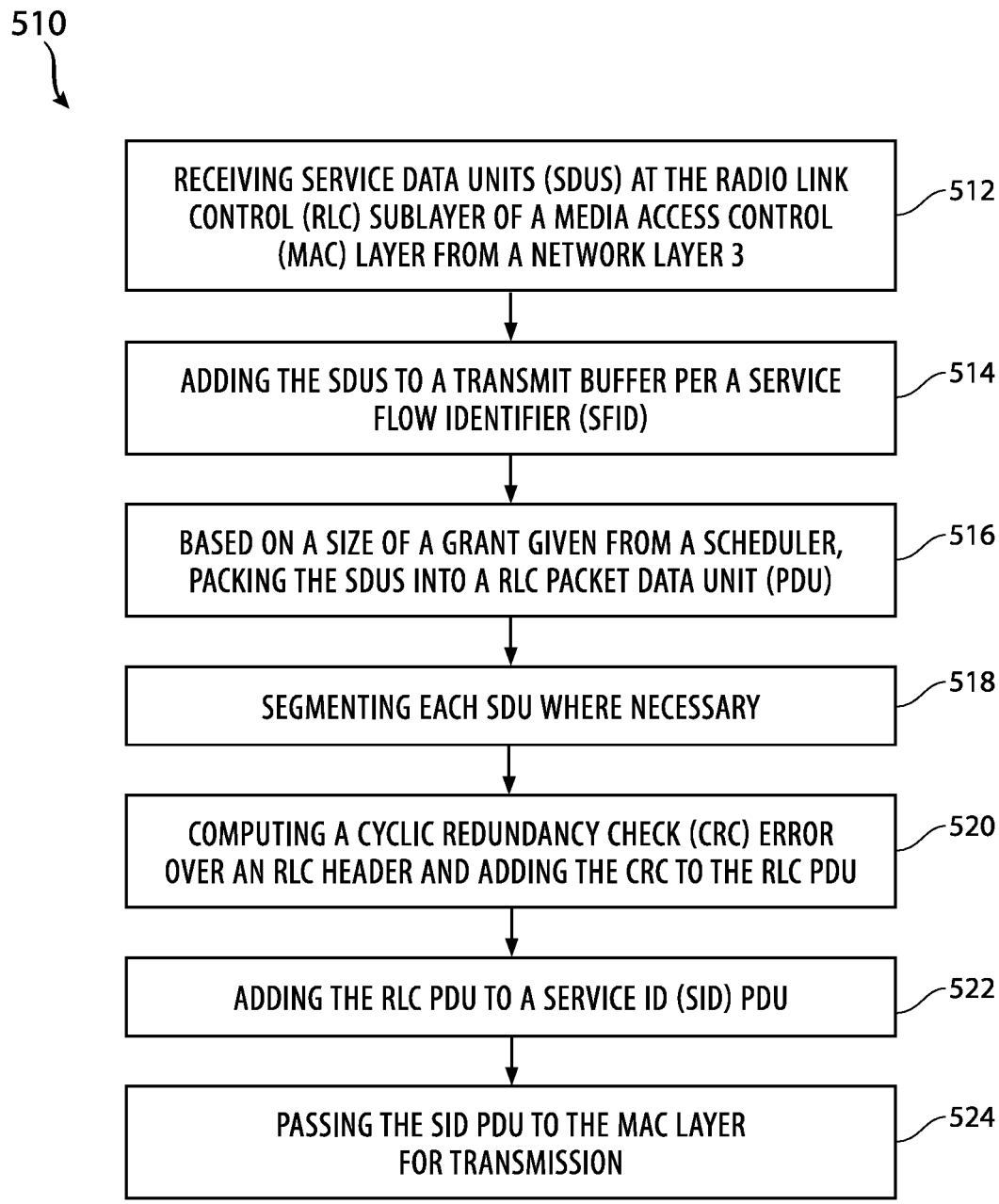

FIG. 5B illustrates another example of the operations of the TX_RLC sublayer 442 and the RX_RLC sublayer 444 in the context of the TX_LMAC 402 and the RX_LMAC 404. When the unacknowledged mode is active, the following method is performed by the TX_RLC sublayer 442. A method 510 can include receiving service data units (SDUs) at the RLC sublayer of a media access control (MAC) layer from a network layer 3 (512), adding the SDUs to a transmit buffer per a service flow identifier (SFID) (514), based on a size of a grant given from a scheduler, packing the SDUs into a RLC packet data unit (PDU) (516), segmenting each SDU where necessary (518), computing a cyclic redundancy check (CRC) error over an RLC header and adding the CRC to the RLC PDU (520), adding the RLC PDU to a Service ID (SID) PDU (522) and passing the SID PDU to the MAC layer for transmission (524).

Figure 5C:
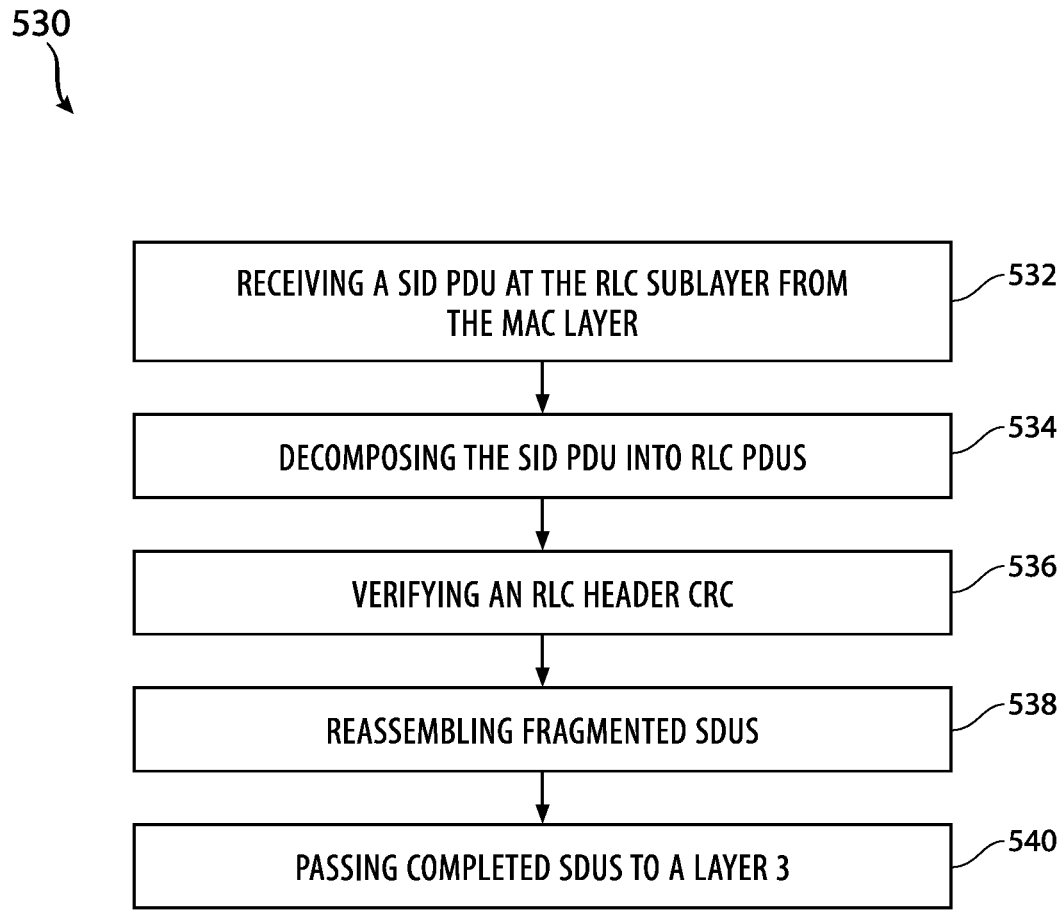

FIG. 5C illustrates another example of the operations of the TX_RLC sublayer 442 and the RX_RLC sublayer 444 in the context of the TX_LMAC 402 and the RX_LMAC 404. When the unacknowledged mode is active, the following method is performed by the RX_RLC sublayer 444. A method 530 includes receiving a SID PDU at the RLC sublayer from the MAC layer (532), decomposing the SID PDU into RLC PDUs (534), verifying an RLC header CRC (536), reassembling fragmented SDUs (538) and passing completed SDUs to a layer 3 (540).

Figure 5D:
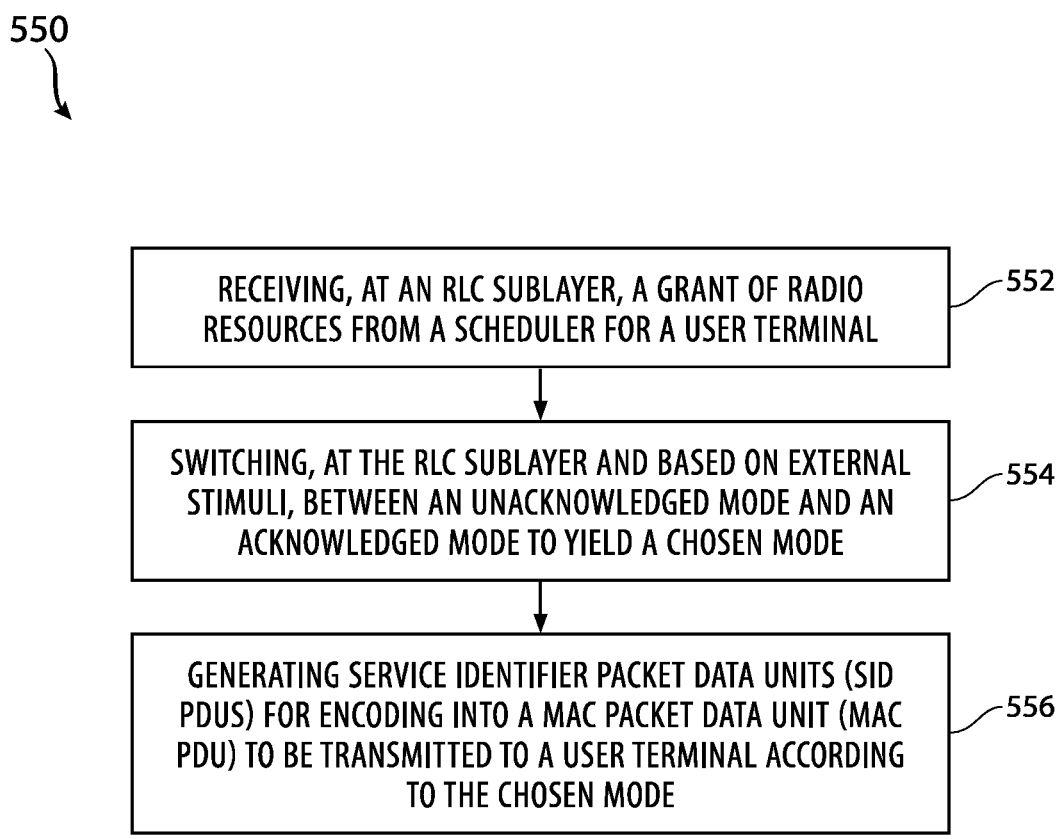

FIG. 5D illustrates steps occurring in the TX_LMAC 402 shown in FIG. 4A. The method 550 includes receiving, at an RLC sublayer, a grant of radio resources from a scheduler for a user terminal (552), switching, at the RLC sublayer and based on external stimuli, between an unacknowledged mode and an acknowledged mode to yield a chosen mode (554), and generating service identifier packet data units (SID PDUs) for encoding into a MAC packet data unit (MAC PDU) to be transmitted to a user terminal according to the chosen mode (556).

An example of the external data or stimuli can be a link quality between a user terminal and a satellite utilizing such data as a strength of a received signal or other indicator of link quality. In one aspect, the external data can refer to a trend in a link quality between a user terminal and a satellite. User profiles, priority categories from users, and so forth may also play a role in the evaluation of framework in which the system adapts the modes.

Adaptively switching between the unacknowledged mode and the acknowledged mode for the electronic communications further can include switching from the unacknowledged mode to the acknowledged mode in order to improve network reliability to a quality of service level.

In the unacknowledged mode, the radio link control sublayer can provide (1) fragmentation and reassembly of service data units; (2) the use of radio link control headers; and (3) no delivery guarantees. In the acknowledged mode, the radio link control sublayer further can provide (1) fragmentation and reassembly of service data units; and (2) the use of RLC headers.

In another aspect, the RLC sublayer further can provide, depending on whether the RLC sublayer is in the unacknowledged mode, or the acknowledged mode, one or more of (1) service data unit ingress management; (2) quality of service services; (3) error correction through automatic repeat requests; (4) RLC protocol data unit fragmentation and reassembly, (5) reordering of RLC protocol data units; and (6) duplication detection.

Figure 6:
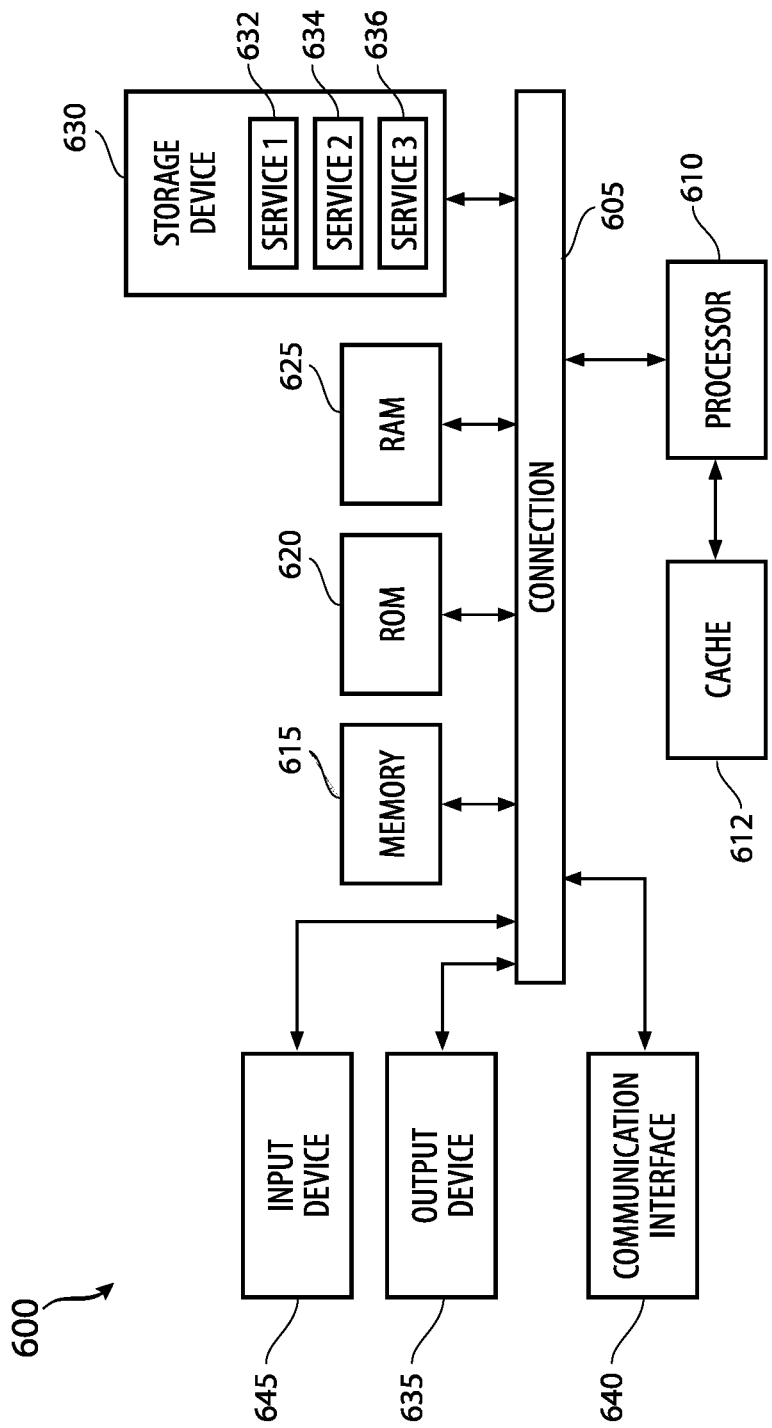
FIG. 6 illustrates example computer components that can be applicable to any embodiment disclosed herein.

FIG. 6 illustrates example computer device that can be used in connection with any of the systems disclosed herein. In this example, FIG. 6 illustrates a computing system 600 including components in electrical communication with each other using a connection 605, such as a bus. System 600 includes a processing unit (CPU or processor) 610 and a system connection 605 that couples various system components including the system memory 615, such as read only memory (ROM) 620 and random access memory (RAM) 625, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware or software service or module, such as service (module) 1 632, service (module) 2 634, and service (module) 3 636 stored in storage device 630, configured to control the processor 610 as well as a special-purpose processor where software instructions are incorporated into the actual processor design. The processor 610 may be a completely self-contained computing system, containing multiple cores or processors, a bus, memory controller, cache, etc. A multi-core processor may be symmetric or asymmetric.

To enable user interaction with the device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include services or modules 632, 634, 636 for controlling the processor 610. Other hardware or software modules are contemplated. The storage device 630 can be connected to the system connection 605. In one aspect, a hardware module that performs a particular function can include the software component stored in a computer-readable medium in connection with the necessary hardware components, such as the processor 610, connection 605, output device 635, and so forth, to carry out the function.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, satellite components, smart phones, small form factor personal computers, mobile devices, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A method comprising:
    adaptively switching, via a RLC sublayer configured on top of a MAC portion of a layer 2 protocol for electronic communications and based on external data, between an unacknowledged mode and an acknowledged mode for the electronic communications;
    when the RLC sublayer operates in the unacknowledged mode, providing, via the RLC sublayer, at least one of fragmentation and reassembly of service data units, a use of RLC headers, or no delivery guarantees; and
    when the RLC sublayer operates in the acknowledged mode, providing, via the RLC sublayer, reliability in a sequence delivery service and at least one of fragmentation and reassembly of service data units, or the use of RLC headers, wherein the external data comprises at least one of a clock rate associated with a link between a user terminal and a satellite, a number of user terminals communicating on a channel associated with the satellite, a number of user terminals communicating with the satellite, a time associated with one or more electronic communications, or a geographic location of one or more user terminals in communication with the satellite.

2. The method of claim 1, wherein adaptively switching between the unacknowledged mode and the acknowledged mode for the electronic communications further comprises switching from the unacknowledged mode to the acknowledged mode in order to improve network reliability to a quality of service level.

3. The method of claim 1, wherein in the unacknowledged mode, the RLC sublayer provides fragmentation and reassembly of service data units, the use of RLC headers, and no delivery guarantees.

4. The method of claim 1, wherein in the acknowledged mode, the RLC sublayer further provides fragmentation and reassembly of service data units, and the use of RLC headers.

5. The method of claim 1, wherein the RLC sublayer further provides, depending on whether the RLC sublayer is in the unacknowledged mode or the acknowledged mode, at least one of service data unit ingress management, quality of service services, error correction through automatic repeat requests, RLC protocol data unit fragmentation and reassembly, reordering of RLC protocol data units, and duplication detection.

6. A device comprising:
    one or more processors; and
    at least one computer-readable storage medium having stored thereon instructions which, when executed by the one or more processors, cause the one or more processors to perform operations comprising:
        adaptively switching, via a RLC sublayer configured on top of a MAC portion of a layer 2 protocol for electronic communications and based on external data, between an unacknowledged mode and an acknowledged mode for the electronic communications;
        when the RLC sublayer operates in the unacknowledged mode, providing, via the RLC sublayer, at least one of fragmentation and reassembly of service data units, a use of RLC headers, or no delivery guarantees; and
        when the RLC sublayer operates in the acknowledged mode, providing, via the RLC sublayer, reliability in a sequence delivery service and at least one of fragmentation and reassembly of service data units, or the use of RLC headers, wherein the external data comprises at least one of a clock rate associated with a link between a user terminal and a satellite, a number of user terminals communicating on a channel associated with the satellite, a number of user terminals communicating with the satellite, a time associated with one or more electronic communications, or a geographic location of one or more user terminals in communication with the satellite.

7. The device of claim 6, wherein adaptively switching between the unacknowledged mode and the acknowledged mode for the electronic communications further comprises switching from the unacknowledged mode to the acknowledged mode in order to improve network reliability to a quality of service level.

8. The device of claim 6, wherein in the unacknowledged mode, the RLC sublayer provides fragmentation and reassembly of service data units, the use of RLC headers, and no delivery guarantees.

9. The device of claim 6, wherein in the acknowledged mode, the RLC sublayer further provides fragmentation and reassembly of service data units, and the use of RLC headers.

10. The device of claim 6, wherein the RLC sublayer further provides, depending on whether the RLC sublayer is in the unacknowledged mode or the acknowledged mode, at least one of service data unit ingress management, quality of service services, error correction through automatic repeat requests, RLC protocol data unit fragmentation and reassembly, reordering of RLC protocol data units, and duplication detection.

11. The device of claim 6, wherein the device comprises one of a user terminal or a satellite.

12. An apparatus comprising:
one or more processors; and
a communication system that coordinates with the one or more processors and includes a physical layer, a MAC sublayer, a RLC sublayer and a network layer, wherein RLC sublayer is configured to adaptively switch, based on external data, between an acknowledged mode and an unacknowledged mode for electronic communications between the apparatus and a device, wherein the external data comprises at least one of a clock rate associated with a link between a user terminal and a satellite, a number of user terminals communicating on a channel associated with the satellite, a number of user terminals communicating with the satellite, a time associated with one or more electronic communications, or a geographic location of one or more user terminals in communication with the satellite.

13. The apparatus of claim 12, further comprising:
a scheduler, wherein the scheduler generates grants of radio resources within a frame of data for a user terminal to access for transmitting user data from the user terminal, wherein the grants are provided to the RLC sublayer such that the RLC sublayer can utilize the grants to determine which error correction mode to use for a given user terminal.

14. The apparatus of claim 12, wherein the RLC sublayer further comprises:
a transmit RLC sublayer; and
a receive RLC sublayer.

15. The apparatus of claim 14, wherein the transmit RLC sublayer comprises a transmit RLC packet data unit processor, a service ID packet data unit encoder and a replay data/store, and wherein the receive RLC sublayer comprises a receive radio link control packet data unit processor, a RLC control unit, a service ID packet data unit decoder and a reassembly data/store.

* * * * *